United States Patent

[11] 3,619,804

| [72] | Inventor | William E. Mears<br>Kansas City, Kans. |
|---|---|---|
| [21] | Appl. No. | 793,325 |
| [22] | Filed | Jan. 23, 1969 |
| [45] | Patented | Nov. 9, 1971 |
| [73] | Assignee | Wilcox Electric Company, Inc.<br>Kansas City, Mo. |

[54] FREQUENCY DISCRIMINATOR USING AN INTERMITTENTLY PHASE-LOCKED LOOP
26 Claims, 4 Drawing Figs.

[52] U.S. Cl. .................................................. 331/8,
331/10, 331/14, 331/26, 331/36 C, 331/117 R, 331/177 V
[51] Int. Cl. ...................................................... H03b 3/04
[50] Field of Search .......................................... 331/8, 10, 14, 26, 36 R, 36 C, 117 R, 177 R, 177 V, 180

[56] References Cited
UNITED STATES PATENTS
3,059,187  10/1962  Jaffe .............................. 331/14 X OTHER REFERENCES
Butler, Wireless World, Feb., 1965, pp. 58–61.
Lohrmann et al., Electronic Design, Vol. 25, Dec. 5, 1968, pp. 80–83.

*Primary Examiner*—Roy Lake
*Assistant Examiner*—Siegfried H. Grimm
*Attorney*—Hurvitz and Rose ABSTRACT: A frequency discriminator which compares a standard and an unknown frequency and generates a pulse output, the amplitude of which is proportional to the difference between the two frequencies. An amplitude sampling bridge is employed as a phase detector and is insensitive to harmonics, in that the standard frequency may be a subharmonic of the actual frequency with which the unknown frequency is to be compared. The standard frequency and the unknown frequency are delivered to the bridge in succession and individually compared with the output of an electrically controllable, variable frequency oscillator which is initially frequency-locked to the standard frequency, via a first control circuit and then via a second control circuit frequency-locked to the unknown frequency by the output pulse, the amplitude of that pulse being proportional to the frequency change of the oscillator output in proceeding from its first frequency-locked condition to its ultimate frequency.

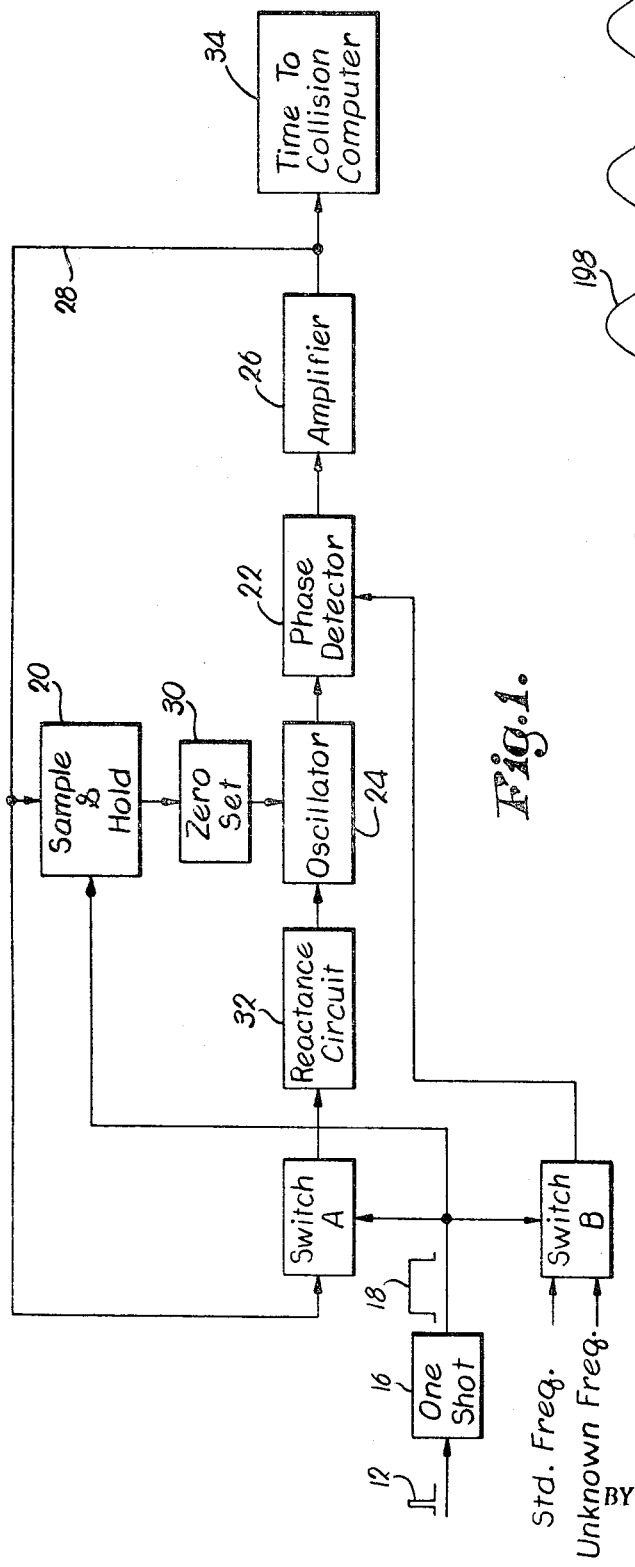
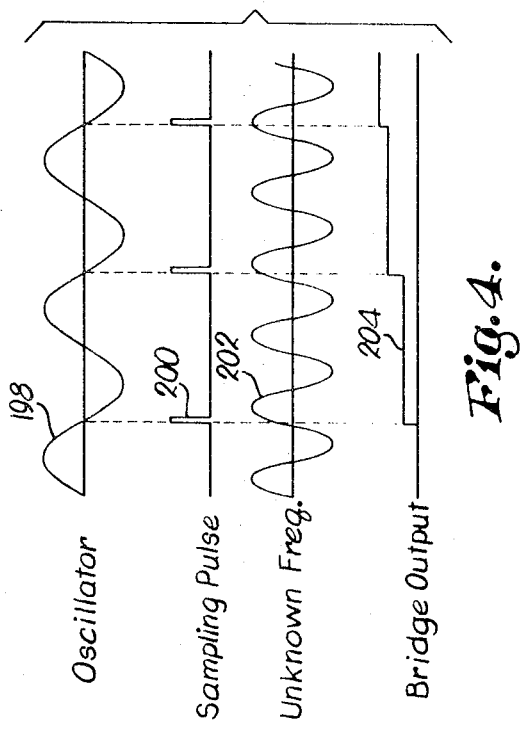
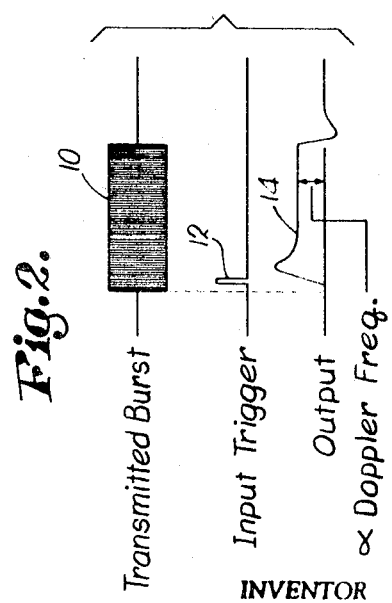

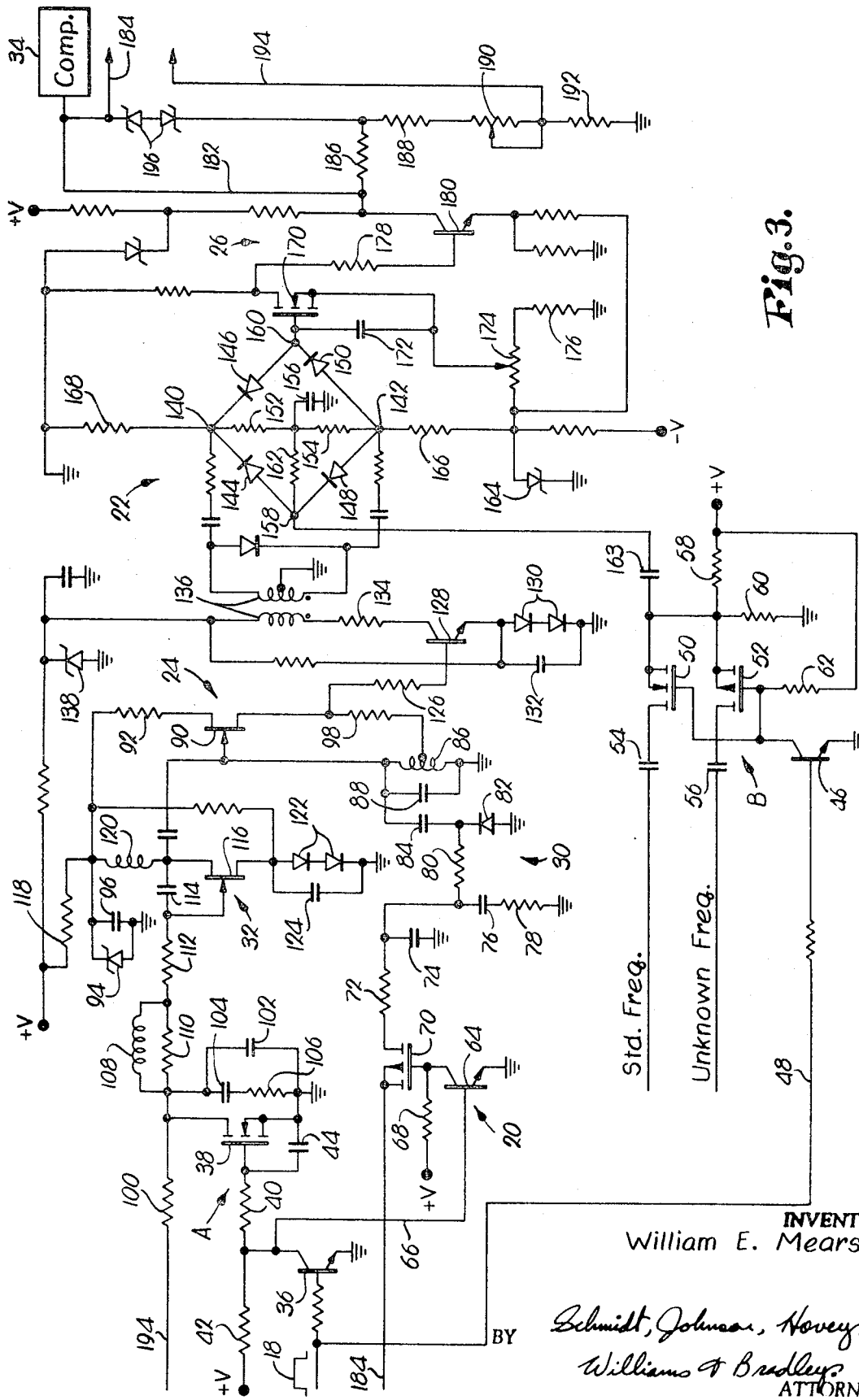

FREQUENCY DISCRIMINATOR USING AN INTERMITTENTLY PHASE-LOCKED LOOP

In a currently proposed collision-avoidance system for aircraft, the closing speed of two approaching aircraft is determined by the Doppler frequency of a radiofrequency burst transmitted from one aircraft and received by the other. Receiving equipment is required which has accurate means of determining the Doppler shift which is, in effect, a frequency modulation of the transmitted RF burst. Therefore, the conventional crystal discriminator, although subject to inaccuracies at small Doppler shifts, is an obvious choice from the standpoint of accuracy but also possesses a number of disadvantages for airborne applications, not the least of which is the requirement of a bulky, heavy oven to maintain the temperature-sensitive crystal at a constant temperature.

Other disadvantages of crystal discriminators include the relative expense of these units, the requirement of periodic calibration due to long term drift, and the necessity that each unit be separately calibrated by cut-and-try procedures. Furthermore, there are limitations inherent in crystal discriminators in that they normally cannot be repaired in the field, and have limited center frequency adjustment, are amplitude sensitive necessitating that an amplitude limiter be provided, and have a fixed bandwidth.

It is, therefore, the primary object of this invention to provide a frequency discriminator of high accuracy and dependability which does not possess the disadvantages and limitations of crystal discriminators and other prior art frequency-discriminating apparatus.

As a corollary to the foregoing object, it is an important aim of the present invention to provide an improved frequency discriminator which is especially suitable for airborne applications by virtue of its light weight and small physical size.

Another important object of the invention is to provide an improved discriminator as aforesaid in which the center or reference frequency is set by a standard frequency generated within the receiving equipment, and wherein the discriminator is self-correcting between measurements to positively preclude zero drift.

Still other important objects of this invention are to provide a discriminator as aforesaid which is economical, may be repaired in the field, has a bandwidth which may be changed or adjusted, and has an extremely wide frequency range.

Furthermore, an additional object of particular importance in a collision-avoidance system is to provide such a discriminator having a variable bandwidth in operation, wherein a wide bandwidth is employed during acquisition to provide fast lock with narrow bandwidth being employed after lock-on to give a tracking filter effect.

In the drawings:

FIG. 1 is a block diagram of the frequency discriminator of the present invention showing the same as employed in a collision-avoidance system;

FIG. 2 is a series of graphs of time-related waveforms illustrating the overall operation of the discriminator of Fig. 1;

FIG. 3 is an electrical schematic diagram of the discriminator; and

FIG. 4 is a series of graphs of time-related waveforms illustrating the operation of the phase detector of the discriminator.

A transmitted, radiofrequency burst 10 is illustrated in FIG. 2 and represents the repetitive transmission emanating from an aircraft equipped with a collison-avoidance system in which the Doppler frequency of the transmitted burst, as received at another aircraft, is indicative of the closing rate of the two aircraft, assuming that they are flying crossing paths. A currently proposed collision-avoidance system employs a 3-second epic in which each aircraft is assigned a 1500 microsecond slot. Once during each epic at the assigned slot, a given aircraft transmits its burst 10 for reception by other aircraft within the range of the transmission. Synchronization of the systems in the various aircraft is achieved by a ground transmission clock so that all aircraft transmit only during the assigned slots. Since the same timing information is available at each aircraft, the time delay of the burst 10 in traveling from one aircraft to another gives the range between the two aircraft under consideration. The present invention, however, is concerned with the manner in which the closing rate of two such aircraft is determined, assuming that the system determines that the two aircraft are on a collision course.

The length of the burst 10 is 200 $\mu$sec., and during approximately the first 12 $\mu$sec. the receiving equipment in an aircraft receiving the burst 10 determines whether or not the burst 10 is a valid transmission or merely a spurious signal to be disregarded. If valid, the receiving equipment generates an input trigger as illustrated at 12 to command the frequency discriminator of the equipment to determine the Doppler frequency of the RF energy of burst 10. Within the receiver circuitry, the center or reference frequency of the burst 10 is the intermediate frequency of the superheterodyne receiver. Thus, the problem is akin to determining the deviation from the center frequency of a frequency modulated wave, but in a collison-avoidance system the modulation is due to the Doppler effect rather than a modulating signal impressed upon a carrier at the transmitting equipment.

A discriminator output pulse 14 is illustrative of the output of the discriminator of the present invention to be described fully hereinbelow. After an initial peak or transient surge, the amplitude of the discriminator output is damped and appears as a relatively steady output, the amplitude of which is proportional to the Doppler frequency.

The general manner in which the foregoing discrimination process is effected is illustrated in Fig. 1. A monostable multivibrator or "one shot" 16 receives the input trigger 12 and generates a gate 18 that is delivered to a pair of electronic switches A and B. The gate 18 is also fed to a sample-and-hold circuit 20 for a purpose to be discussed. In standby prior to the generation of the input trigger 12, a signal of a standard, fixed frequency is fed to switch B and is delivered therefrom to a phase detector 22 where the standard frequency is compared with the frequency of oscillation of a variable frequency oscillator 24. The function of the phase detector 22, when the apparatus is in standby, is to produce an output signal of constant amplitude which maintains the frequency of the oscillator 24 at the standard frequency, the latter being equal to the reference frequency of the burst 10 (the receiver IF) or a subharmonic thereof. After amplification by the amplifier 26, the output signal is fed to the sample-and-hold circuit 20 by a frequency control loop 28. In its sampling function, the sample-and-hold circuit 20 delivers the detector output signal to a zero set tuning circuit 30 which controls the frequency of the oscillator 24 during standby operation.

Upon generation of the input trigger 12 and hence the gate 18, both switches A and B are operated to now cause the phase detector output to be delivered to a variable reactance tuning circuit 32, and to cause the transmitted burst 10 of unknown frequency to be delivered to the phase detector 22. At this time the sample and hold circuit 20 executes its holding function and maintains the reactance of the zero set tuning circuit 30 at the previously set value during the period of the gate 18. The reactance circuit circuit 32 now tunes the oscillator 24 to the unknown frequency (or a subharmonic thereof) in accordance with the amplitude of the amplified detector output pulse 14 appearing in the frequency control loop 28. Ultimately, therefore, the oscillator 24 is shifted in frequency to a degree depending upon the deviation of the frequency of the transmitted burst 10 from the center or reference frequency thereof. Such deviation is the Doppler frequency and is represented by the amplitude of the phase detector output 14 as discussed above. A time-to-collison computer 34 is responsive to the output signal 14 and is now activated to make the time-to-collision computation.

The discriminator circuitry is shown in detail in FIG. 3. A source of positive direct supply potential is indicated by the terminals labeled +V; the terminal —V is a source of negative direct supply potential. An intermediate, ground potential is indicated in the circuitry by the ground symbols. The electronic switch A includes an NPN switching transistor 36 which is nonconductive in standby but is rendered conductive by application of the gate 18 to its base. An N-channel MOSFET 38 has its gate connected to the collector of transistor 36 by a resistor 40. A resistor 42 connects the collector of transistor 36 to the positive supply. A capacitor 44 is connected from the gate of MOSFET 38 to ground and cooperates with the resistor 40 to provide a time delay at the initiation of turnoff of the MOSFET 38.

The gate pulse 18 is conducted to the base of an NPN switching transistor 46 in the electronic switch B by a lead 48. The transistor 46 is nonconductive in standby. The switch B also includes an N-channel MOSFET 50 (on in standby) and a P-channel MOSFET 52 (off in standby), the gates thereof being connected to the collector of transistor 46. The standard frequency input signal is delivered to the drain of MOSFET 50 through a coupling capacitor 54, and the transmitted burst 10 of unknown frequency is delivered to the drain of MOSFET 52 through a coupling capacitor 56. The sources of MOSFETS 50 and 52 are interconnected and receive positive potential via a voltage divider comprising series resistors 58 and 60. The collector of transistor 46 is connected to the positive supply by a resistor 62.

The sample and hold circuit 20 includes an NPN switching transistor 64, the base thereof being connected to the collector of transistor 36 by a lead 66. The collector of transistor 64 is connected to the positive supply by a resistor 68. The transistor 64 is conductive in standby and has its collector connected to the gate of a P-channel MOSFET 70 which also conducts in standby. The drain of MOSFET 70 is connected by a resistor 72 to a capacitor 74 that extends to ground and a series connected capacitor 76 and resistor 78 that extend to ground. A resistor 80 in series with resistor 72 connects the output of the sample and hold circuit 20 to the zero set tuning circuit 30 at the anode of a varactor diode 82. The varactor diode 82 is in series with a capacitor 84 between ground and the upper end of the tank coil 86 of the variable frequency oscillator 24 illustrated in a Hartley configuration.

A fixed capacitor 88 of the oscillator tank is connected in parallel with the coil 86, the lower end thereof being at ground potential as indicated by the symbol. Other principal components of the oscillator 24 include a junction-type field effect transistor (FET) 90, a resistor 92 connecting the drain of FET 90 to positive potential obtained at the anode of a voltage regulating zener diode 94, a bypass capacitor 96 across the zener diode 94, and a resistor 98 connecting the source of FET 90 to a tap on the tank coil 86.

The reactance circuit 32 receives the output signal 14 after shaping and integration thereof by a filter in the frequency control loop 28 (FIG. 1) constituting the series resistor 100, parallel capacitor 102, and series-connected shunt capacitor 104 and resistor 106. The resistors 72 and 78 and capacitors 74 and 76 serve a similar shaping and integrating function with respect to the output signal produced to zero set the oscillator 24 (lock its frequency with the standard frequency).

The resistor 100 is in series with a 90° phase shift network comprising a parallel connected inductor 108 and resistor 110, a series resistor 112, and a series capacitor 114. The common junction of the resistor 112 and capacitor 114 is connected to the gate of a junction type FET 116, the capacitor 114 interconnecting such gate and the drain of the FET 116. Positive operating voltage is supplied through a resistor 118 and an RF choke 120 in series with the drain. Bias for the source of FET 116 is provided by the voltage drop across a pair of diodes 122 connected in series between the source and ground, and bypassed at radiofrequencies by a capacitor 124.

The output of the oscillator 24 is taken at the source of FET 90 and is coupled by a resistor 126 to the base of an NPN switching transistor 128. A bias arrangement for the emitter of transistor 128 includes a pair of series connected diodes 130 from the emitter to ground bypassed by a capacitor 132. The emitter-collector circuit of transistor 128 is in series relationship with a collector resistor 134 and the primary winding of a transformer 136 connected to the positive supply obtained across a voltage regulating zener diode 138. The transistor 128 is in conduction only during positive half cycles of the oscillator output.

The secondary winding of the transformer 136 has a grounded center tap, the ends of the secondary being connected to diametrically opposed terminals 140 and 142 of an amplitude sampling bridge having four diode arms 144, 146, 148 and 150. A pair of series resistors 152 and 154 of equal ohmic value interconnect terminals 140 and 142, their common junction being bypassed to ground by a capacitor 156. The four diodes of the bridge are all poled in the same direction and form two parallel paths for current flow in the positive sense from terminal 142 to terminal 140. The remaining two terminals 158 and 160 of the bridge are formed at the junction of arms 148 and 144, and arms 150 and 146 respectively. The terminal 158 is connected to the common junction of resistors 152 and 154 by a resistor 162. A coupling capacitor 163 connects the common sources of MOSFETS 50 and 52 of the electronic switch B to the bridge terminal 158. The bridge is normally biased in a direction to prevent conduction of the four diode arms, the negative bias voltage being obtained across a zener diode 164 connected to the negative supply terminal −V. A resistor 166 connects terminal 142 to the negative supply, and a resistor 168 extends between the terminal 140 and ground to complete the bias circuit.

The amplifier portion 26 of the circuitry comprises two stages, the first stage being provided by an N-channel MOSFET 170 which has its gate connected to the bridge terminal 160. The MOSFET 170 has a high-impedance input and serves as a low-gain DC amplifier. A capacitor 172 on the input of MOSFET 170 is connected between the gate (terminal 160) and the source of MOSFET 170. An adjustable resistor 174 and a fixed resistor 176 form a voltage divider across the zener diode 164, the variable tap on the resistor 174 being connected to the lead extending from capacitor 172 and the source of MOSFET 170. The resistors 174 and 176 are approximately of the same value so that adjustment of resistor 174 effectively controls the output of the first stage of amplification, which is taken at the drain of MOSFET 170 and coupled by a resistor 178 to an NPN transistor amplifier 180. The transistor 180 provides the second and final stage of amplification and serves as a DC amplifier, and also provides the capability of both positive and negative voltage switch swing in the discriminator output signal. The output of transistor amplifier 180 is taken at the collector thereof and is divided before the output is introduced into the frequency control loop 28 illustrated diagrammatically in FIG. 1, one portion of the output being delivered along a lead 182 to the computer 34 and to a lead 184 that extends back to the source of MOSFET 70 in the sample-and-hold circuit 20. The other portion of the final amplifier output is coupled by a resistor 186 to three series resistors 188, 190 and 192, the resistor 190 being variable as illustrated to provide an adjustable voltage divider for delivery of a portion of the amplifier output along a lead 194 back to the series resistor 100 which feeds the output signal to the electronic switch A and the reactance circuit 32. A pair of back-to-back zener diodes 196 are connected in parallel with the resistor 186 and provide a correction in the gain of the amplifier 180 to be discussed hereinafter. The variable voltage divider formed by resistors 188, 190 and 192 is employed to accurately align the reactance circuit 32 in order to precisely control the response thereof to the output signal, such as illustrated at 14 in FIG. 2.

OPERATION

For purposes of illustration of the operation of the discriminator it is assumed that the standard frequency (which may be obtained from a crystal oscillator stage, not shown) is 5 MHz., and that the intermediate frequency of the superheterodyne receiver is 10 MHz. Thus, since the discriminator would be employed after the IF stages of the receiver, the center or reference frequency of the transmitted burst 10 is also 10 MHz. Therefore, the Doppler frequency will be the difference between the actual frequency of the burst 10 and the 10 MHz. reference frequency.

Appropriate values of inductance and capacitance in the tank of the variable frequency oscillator 24 are selected to provide resonance at 5 MHz. In standby before the input trigger 12 is produced, the standard frequency signal is delivered to bridge terminal 158 since the MOSFET 50 in electronic switch B is conducting. The switching transistor 128 is on during positive half cycles of the output signal of oscillator 24; when the oscillator output goes negative, the transistor 128 ceases to conduct and a positive sampling pulse is produced at the primary of the transformer 136. Thus, it should be understood that the oscillator output signal is not fed to the amplitude-sampling bridge; instead, a sampling pulse indicative of the commencement of a negative half cycle of the oscillator output signal is produced.

To explain more fully, reference is made to FIG. 4 which presents a graphical analysis of the manner in which the oscillator 24 is frequency locked with the transmitted burst 10 of unknown frequency. At this juncture, only the oscillator output signal waveform 198 and the sampling pulse waveform 200 are to be considered, since the two remaining graphs are applicable to operation to be subsequently discussed that occurs after the input trigger 12 is produced. Fig. 4 clearly illustrates that the sampling pulse 200, which is generated at the time that the switching transistor 128 turns off, has its leading edge aligned with the zero crossing of a corresponding cycle of the oscillator output signal 198 as such signal commences its negative half cycle. The sampling bridge is normally not in conduction due to the negative bias on the anodes of the diode arms 148 and 150, and the positive bias on the cathodes of the diode arms 144 and 146; however, each sampling pulse 200 places the bridge in momentary conduction, during which time the amplitude of the standard frequency signal is effectively compared with the amplitude of the oscillator signal 198. This is accomplished since the sampling pulse 200 drives bridge terminal 142 positive with respect to bridge terminal 140 so that that now the voltage appearing at bridge terminal 158 (which is receiving the standard frequency signal) with respect to ground is reflected at bridge terminal 160. Thus, it may be appreciated that, if the standard frequency signal is at a zero crossing, the capacitor 172 connected to terminal 160 will not accumulate any charge. (Should the standard frequency signal happen to be going positive at the zero crossing rather than negative, no charge will accumulate but this is an unstable condition that will self-correct when the zero crossing time drifts from synchronization with the sampling pulse.)

However, if the oscillator output signal 198 and the standard frequency signal are not in phase, the capacitor 172 charges to a degree dependent upon the phase difference between the two signals. The voltage appearing at capacitor 172 is amplified and delivered via lead 184 to the sample and hold circuit 20, the MOSFET 70 thereof being on in standby. The integrating filter formed by RC components 72, 74, 76 and 78 delivers the shaped output signal to the varactor diode 82 of the zero set tuning circuit 30 to change the capacitive reactance in the oscillator tank to bring the oscillator output signal 198 into frequency lock and near phase lock with the standard frequency signal. At the outset of a frequency correction, the shape of the output signal applied to the varactor diode 82 is generally the same as the shape of the output pulse 14 illustrated in FIG. 2 except, of course, the amplitude thereof has no relationship to Doppler frequency but is the amplitude required to maintain the varactor diode 82 at a value of reactance that will hold the oscillator output signal 198 at the same frequency as the standard frequency, 5 MHz. in the instant example. Since some voltage across the varactor diode 82 will be required to maintain the frequency-locked condition, a slight but constant phase difference will exist between the two signals, such phase difference being determined by the amplitude of the phase detector output required to hold the varactor diode 82 at the proper value of reactance.

In the standby condition discussed above, the MOSFET 38 in electronic switch A is on and thus the input of the reactance circuit 32 is grounded. This places a constant capacitance in parallel with the oscillator tank, such constant value of capacitance always being assumed by the reactance circuit 32 when the apparatus is in standby and tuning is under the control of the varactor diode 82.

Assuming now that the input trigger 12 is produced signifying that the transmitted burst 10 from another aircraft has been received and determined to be valid, the gate 18 is generated by the one shot 16 to operate both of the electronic switches A and B. In switch A, transistor 36 is rendered conductive by the gate 18 to ground the gate connection of MOSFET 38, thereby turning the latter off to permit delivery of the amplified phase detector output signal to the reactance circuit 32. The time constant of resistor 40 and capacitor 44 delays this occurrence for a brief period of time to assure that the transistor 64 in the sample-and-hold circuit 20 is turned off in response to turn on of transistor 36 prior to actual turnoff of the MOSFET 38. During the period of the gate 18, the capacitors 74 and 76 associated with the sample-and-hold circuit 20 serve to maintain the voltage across the varactor diode 82 at the same level as just required for the zero set function (frequency locking of the oscillator 24 and to the 5 MHz. standard frequency). With the transistor 64 now nonconductive, the MOSFET 70 turns off and the output signal appearing on lead 184 is prevented from affecting the charge on the capacitors 74 and 76.

The gate 18 is also fed by lead 48 to the transistor 46 in electronic switch B, thereby turning the transistor 46 on to reverse the states of the MOSFETS 50 and 52. Thus, MOSFET 52 is now on and delivers the transmitted burst 10 of unknown frequency to bridge terminal 158. As before, the sampling pulse 200 is produced each time the oscillator output signal 198 goes negative. Therefore, the unknown frequency is now effectively compared with the frequency of the oscillator output signal 198, which is the same as the standard frequency by virtue of the previous frequency locking while the apparatus was in standby.

The unknown frequency waveform is illustrated at 202 in FIG. 4 and the output of the bridge appearing across capacitor 172 is illustrated at 204. It may be immediately observed that a strict frequency comparison between waveforms 202 and 198 is not to be accomplished, since in the instant example the reference frequency (receiver IF) is 10 MHz. while the standard frequency and the oscillator output signal 198 equal 5 MHz. The amplitude sampling bridge is insensitive to harmonics in that the signal from which the sampling pulses 200 are derived may be a subharmonic of the input signal applied to bridge terminal 158 by the electronic switch B. Therefore, broadly speaking, the voltage developed across the capacitor 172 is indicative of the incoherence between the two signals under comparison before the oscillator output signal 198 is shifted in frequency, and the amplitude of the output signal 14 is representative of this difference in coherence. In turn, the phase relationship between the two signals under comparison is constant after the initial transient or peak at the leading edge of the output signal 14 because the oscillator output signal 198 is now shifted to a frequency which is an exact subharmonic of the unknown frequency. This frequency shift is proportional to the Doppler shift of the transmitted burst 10; therefore, the amplitude of the output signal 14 is also proportional to the Doppler frequency.

The manner in which the reactance circuit 32 effects the shift in the oscillator frequency from the standard frequency to a subharmonic of the unknown frequency will now be discussed. At the time that operation of electronic switches A and B is effected by the gate 18 to terminate delivery of the input signal of standard frequency to the sampling bridge and commence delivery of the transmitted burst 10 of unknown frequency to the bridge, it is likely that the phase difference will be great, resulting in a transient surge at the bridge terminal 160 as represented by the leading peaked edge of the output signal waveform 14. The integrating effect of the filter in the frequency control loop constituted by capacitors 102 and 104 and resistors 100 and 106 damps any oscillations in the output signal that would otherwise appear. Thus, the transient surge causes a rapid change in the frequency and phase of the oscillator output signal 198 which, in less than 100 μsec., arrives at a constant phase relationship with the transmitted burst 10 and is frequency-locked with a frequency equal to one-half of the frequency of the transmitted burst 10, as indicated by the fact that the amplitude of the output signal 14 has assumed a constant level. During the transient surge period, the back-to-back zener diodes 196 assist in the shaping of the transient response by holding the voltage across the resistor 186 to a predetermined maximum level to increase the gain of the final DC amplifier 180 when the phase difference of the two signals is great, the net effect being to shorten the time duration of the transient surge period.

In order to control the frequency and phase of the oscillator stage 24, the variable reactance circuit 32 serves as a capacitive reactance that is varied in accordance with the amplitude and sign of the output signal 14. This controllable reactance is in parallel with the tank capacitor 88 and is formed by a current path from the drain of the FET 116 to ground via the source-drain circuit of FET 116. Additionally, another AC path is provided from the drain of the FET 116 through the 90° phase shift network (capacitor 114, resistors 110 and 112, and inductor 108) to ground via the capacitor 102 which serves a bypass function at the standard frequency.

The resistance of the series resistors 110 and 112 is relatively low, on the order of 500 to 1,000 ohms, for example. The capacitor 114, however, is selected to exhibit a reactance at the standard frequency which is relatively high compared to the series resistance of the resistors 110 and 112 (2 picofarads would be appropriate for the 5 MHz. standard frequency). Therefore, the current through the capacitor 114 is 90° out of phase with the voltage on the drain of the FET 116 to which one plate of the capacitor 114 is connected, and the AC voltage on the gate of the FET 116 (to which the other plate of capacitor 114 is connected) is also 90° out of phase with the voltage on the drain since the current path remaining from the gate to ground through the series resistors 110 and 112 is substantially entirely resistive. Furthermore, since the gate voltage controls the current through the source-drain circuit of the FET 116, and the gate voltage is in substantial phase with the drain current, the cumulative effect of the phase shift arrangement is to cause the drain current to lead the voltage on the drain by 90°. Therefore, the FET 116 has the characteristics of a capacitor and, being connected in parallel with the tank coil 86, cooperates therewith to form a variable tuning circuit that is electrically controlled by the amplitude and sign of the output signal 14, the latter being essentially DC and thus not affected by the 90° phase shift network. A positive output signal 14 increases the capacity exhibited by FET 116, and a negative output signal 14 decreases such capacity, the change is either direction being due to the corresponding current change in the source-drain circuit. The function of the inductor 108 in the phase shift network is to compensate for the resistive component of the series impedance of the network and to compensate for the delay in the FET 116 due to electron transit time, in order to establish as nearly a 90° phase difference between the drain voltage and the drain current of the FET 116 as possible.

It is important to appreciate that the field effect transistor is a square law device in that the drain current is equal to the square of the gate voltage multiplied by an appropriate constant. Since the FET 116 operates in accordance with square law characteristics, the voltage (at the gate connection) to capacity variation is linear and thereby provides a linear voltage to frequency variation for tuning.

An example of the operating characteristics of the sampling bridge is shown in FIG. 4. Here it is assumed that the waveform 202 of the transmitted burst 10 of unknown frequency is slightly higher in frequency than the reference due to the Doppler shift phenomenon. At the time of the first sampling pulse 200, a relatively small phase difference is detected and the capacitor 172 is charged accordingly as indicated by the bridge output waveform 204. At the time of the next sampling, an even greater out-of-phase relationship is noted since it is assumed that the oscillator output signal 198 has not as yet had time to shift in frequency; the bridge output increases accordingly. The difference is even greater at the time of the third sampling pulse 200, the bridge output waveform 204 illustrating that the capacitor 172 charges to still a higher level. Thus, the capacitor 172 charges and holds its voltage until the next sampling occurs, whereupon the capacitor 172 may charge up or down depending upon whether or not the phase difference has increased or decreased. Ultimately, of course, the oscillator output signal 198 is shifted to a frequency equal to one-half of the unknown frequency represented by waveform 202, and is shifted in phase until the phase relationship between the two signals is constant and such that the level of the amplified and shaped output signal 14 holds the oscillator stage 24 at the attained frequency. At the termination of the gate pulse 18, the oscillator stage 24 is reset to the standard frequency and the discriminator awaits the production of a subsequent input trigger 12 indicative of another valid, transmitted burst 10 whose Doppler frequency is to be determined.

Having thus described the invention, what is claimed as new and desired to be secured by Letters Patent is:

1. A frequency discriminator comprising:
 a variable frequency oscillator for producing an oscillator signal of controllable frequency;
 electrical phase detecting means;
 circuitry coupled with said detecting means for successively delivering thereto a first input signal of a standard frequency and a second input signal of an unknown frequency that may differ from a reference frequency, said standard and reference frequencies being the same or harmonically interrelated,
 said detecting means being coupled with said oscillator via a first frequency control circuit for comparing the phasing of said first input and controllable frequency signals and producing a first output signal representative of any detected phase difference, and for comparing via a second frequency control circuit the phasing of said second input and controllable frequency signals and producing a second output signal representative of the detected phase difference as said first and second input signals are successively delivered to the detecting means,
 said oscillator having two separate means separately responsive to said output signals for tuning the oscillator; and
 separate circuit means coupling the output of said detecting means with said two separate tuning means to complete frequency control loops and excite the tuning means with said first output signal to set the controllable frequency signal at an initial frequency, and to thereafter excite said tuning means with said second output signal to shift the frequency of said controllable frequency signal to a final frequency, said initial and standard frequencies being the same or harmonically interrelated and said final and unknown frequencies being the same or harmonically interrelated, whereby said second output signal is indicative of the difference between said reference and unknown frequencies.

2. The discriminator as claimed in claim 1,
 said circuitry including switching means for receiving said first and second input signals and normally effecting delivery of only said first input signal to said detecting means, and control means coupled with said switching means for operating the latter for a predetermined time period to effect delivery of said second input signal to said detecting means and terminate the delivery of said first input signal thereto.

3. The discriminator as claimed in claim 1, said detecting means including means for sampling the amplitude of said first or said second input signals at predetermined times during each period of said controllable frequency signal as said first and second input signals are successively delivered to the detecting means, and output means responsive to said amplitude sampling for effecting production of the corresponding first or second output signal.

4. The discriminator as claimed in claim 3, said sampling means including a normally nonconductive, amplitude sampling bridge for receiving said first and second input signals, means responsive to said controllable frequency signal for delivering a sampling pulse to said bridge at said predetermined time to render the bridge momentarily conductive and effect said amplitude sampling, and energy storage means operably coupled with said bridge for receiving energy during said momentary conduction and developing a voltage in accordance with the phase difference of the signals under comparison, said output means including an amplifier coupled with said energy storage means for deriving the corresponding first or second output signal from said voltage.

5. The discriminator as claimed in claim 1, said oscillator including a tank circuit having first and second electrically controllable, variable reactance tuning circuits coupled to said tank circuit as said means for tuning the oscillator, said circuit means delivering said first output signal exclusively to said first tuning circuit, and delivering said second output signal exclusively to said second tuning circuit.

6. The discriminator as claimed in claim 5, there being means coupled with said first tuning circuit for holding the latter at the reactance previously required to set the controllable frequency signal at the initial frequency, during delivery of said second output signal to said second tuning circuit.

7. The discriminator as claimed in claim 6, there being means coupled with said second tuning circuit for returning the latter to a constant value of reactance upon termination of delivery of said second output signal thereto.

8. The discriminator as claimed in claim 1, said tuning means including a tank having first and second electrically controllable, variable reactance tuning circuits, said circuit means having first switching means for controlling delivery of said output signals to said tuning circuits and normally establishing electrical continuity only between the output of said detecting means and said first tuning circuit, said circuitry including second switching means for receiving said input signals and normally effecting delivery of only said first input signal to said detecting means, and control means coupled with said first and second switching means for operating the latter for a predetermined time period to effect delivery of said second input signal to said detecting means, terminate the delivery of said first input signal thereto, interrupt said continuity to said first tuning circuit, and establish electrical continuity between the output of said detecting means and said second tuning circuit.

9. The discriminator as claimed in claim 8, there being means coupled with said first tuning circuit for holding the latter, during said predetermined time period, at the reactance previously required to set the controllable frequency signal at the initial frequency; and means coupled with said second tuning circuit for returning the latter to a constant value of reactance following said predetermined time period.

10. The discriminator as claimed in claim 1, said turning means including a tank having a reactive element and an electrically controllable, variable reactance turning circuit capable of resonating with said element, said turning circuit comprising a field effect transistor having source and drain connections and a gate, means coupled with said field effect transistor for applying operating potential thereto, means coupled with said field effect transistor for establishing a substantially 90° phase difference between current flowing through said source and drain connections and the voltage across said connections, means coupling said field effect transistor with said element to cause said current to interact with said element to establish a resonant frequency, and means for receiving one of said output signals and applying the same to said gate to control the magnitude of said current.

11. In a frequency discriminator;

a phase-locked loop including a phase detector, an oscillator connected to said phase detector to provide an input signal thereto, a source of reference signal of standard frequency, a source of unknown frequency, a reactance circuit connectable to said oscillator for tuning said oscillator, a zero set tuning circuit connectable to said oscillator for tuning said oscillator, said zero set tuning circuit being in addition to said reactance circuit, means normally applying said reference signal to said phase detector while maintaining said zero set tuning circuit responsive to the phase-detected output of said phase detector, whereby said oscillator is tuned to a harmonic of said reference frequency by said zero set tuning circuit, a hold circuit for maintaining the zero set tuning circuit at its latest tuning setting despite interruption of said reference frequency, and means for at intervals interrupting said reference frequency and applying said signal of unknown frequency to said phase detector and the phase-detected output of said phase detector to said reactance circuit while said hold circuit maintains the zero set of said oscillator.

12. A system for measuring the divergence of the frequency of a first signal from a standard frequency provided by a source of a standard signal, comprising:

a phase-locked loop including a phase detector having alternative input circuits for said signals and a further input circuit, a frequency controllable oscillator providing a signal to said further input circuit, a zero set frequency control circuit means arranged to be responsive to the output of said phase detector for maintaining a frequency correspondence between the frequency of said oscillator and the frequency of said source of a standard signal, said zero set frequency control circuit including means for maintaining the frequency setting of said zero set frequency control circuit means for a period immediately following a disconnection of said source of a standard signal from said phase detector, and a further frequency control circuit connectable to said oscillator with application to said phase detector of said first signal and disconnection of said source of a standard frequency.

13. A frequency control system, comprising:

an oscillator having a zero set tuner, a source of reference signal of known frequency, a source of further signal of unknown frequency, a phase detector, first frequency control means responsive to said reference signal for controlling said phase detector to set the frequency of said oscillator via said zero set tuner into predetermined frequency relation to the frequency of said reference signal and to maintain the setting of said zero set tuner following a termination of application of said reference signal to said phase detector, second frequency control means responsive to said further signal for controlling said phase detector to modify the frequency of said oscillator into predetermined frequency relation to the frequency of said further signal, and means applying said reference signal and further signal to said phase detector in time sequence.

14. In a system for measuring the frequency differences between a frequency of a signal of fixed reference frequencies constituting harmonics and the frequency of a signal of a randomly variable frequency, a phase-locked loop including a phase detector, a variable frequency oscillator having a zero set tuner, said phase-locked loop including said zero set tuner and oscillator and said phase detector connected in series in the recited order, a source of signal at said reference frequency, means transiently applying said signal of reference frequency and permanently applying the output of said oscillator to said phase detector as inputs to be compared as to frequency by said phase detector, first frequency control means applying the output of said phase detector to control the frequency of said variable frequency oscillator in such sense as to equalize frequency of said oscillator and one of said harmonics of the frequency of said signal of fixed reference frequency and for thereafter for a period of time after disconnection of said signal of fixed reference frequency from said phase detector maintaining fixed said zero set tuner, a second frequency control means for transiently applying said signal of randomly varying frequency to said phase detector with substitution of said signal at said reference frequency and applying the output of said phase detector to further control the frequency of said variable frequency oscillator via second frequency control means during said period of time in such sense as to equalize the frequencies of said oscillator and the frequency of said signal of randomly varying frequency.

15. The method of measuring the difference of frequency between a fixed frequency and a variable frequency, comprising:

voltage controlling the frequency of an oscillator to have a correspondence with said fixed frequency by adjusting a first frequency control circuit for said oscillator and thereafter maintaining the adjustment of said first frequency control circuit for a time period and thereafter and during said time period further voltage controlling the frequency of said oscillator to have correspondence with said variable frequency by adjusting a second frequency control circuit for said oscillator, and indicating the latter voltage as a measure of the difference of frequency.

16. A frequency comparison system, comprising:

a first source of signal of unknown frequency, a second source of signal of standard frequency, a selective switch arranged to select said signals alternatively to an output lead, an oscillator, two reactance tuning circuits coupled to said oscillator for separately controlling the frequency of said oscillator, a phase detector having inputs connected to said output lead of said selective switch and to an output of said oscillator, respectively, and having an output connected in cascade with said oscillator, an off-on switch, a feedback lead extending in cascade with said phase detector, a sample-and-hold zero set circuit including one of said two reactance tuning circuits connected between said feedback lead and said oscillator, a circuit connecting said lead via said off-on switch to the other of said reactance circuits, and means for in alternation turning said off-on switch off and activating said sample-and-hold zero set circuit and activating said selective switch to said signal of standard frequency and thereafter turning on said off-on switch and deactivating said sample-and-hold zero set circuit and controlling said selective switch to select said signal of unknown frequency.

17. The combination according to claim 16 wherein said phase detector is an amplitude sampling bridge circuit.

18. The combination according to claim 17, wherein said phase detector includes means for coupling output of said oscillator at crossover points of said output to develop sampling pulses at said crossover points, and means responsive to said sampling pulses for selectively sampling said signal of unknown frequency and said signal of standard frequency according to the condition of said selective switch.

19. The combination according to claim 18, wherein said sample-and-hold zero set circuit includes a varactor diode connected to control the frequency of said oscillator and a storage capacitor connected to impart its voltage to said varactor diode, and means charging said storage capacitor in response to the output of said phase detector.

20. In a frequency measuring system, a source of signal at reference frequency, a source of signal of unknown frequency, an oscillator, a first voltage-controlled tuner for said oscillator, a second voltage-controlled tuner for said oscillator, a storage capacitor so coupled to said first voltage-controlled tuner that the voltage across said storage capacitor provides the control voltage for said first voltage-controlled tuner, First means responsive to the frequency of said signal at reference frequency for applying a first voltage across said storage capacitor such as to maintain the frequency of said oscillator in predetermined frequency relation to said reference frequency, second means operative only subsequent to operation of said first means and responsive to said signal of unknown frequency to apply to said second voltage-controlled tuner a further control voltage designed to produce a predetermined frequency relation between the frequency of said oscillator and said unknown frequency while said storage capacitor maintains its voltage, whereby said further control voltage is representative of the difference between said unknown frequency and said reference frequency.

21. The combination according to claim 20, wherein said first voltage-controlled tuner is a diode varactor.

22. The combination according to claim 21, wherein said second voltage-controlled tuner is a variable reactance.

23. The combination according to claim 22, wherein said oscillator is incorporated in a phase-locked loop.

24. The combination according to claim 23, wherein said phase-locked loop includes a phase detector of the amplitude sampling type responsive jointly to the output of said oscillator and in alternation to said signal of reference frequency and to said signal of unknown frequency and means for directing the output of said phase detector in corresponding alternation to said diode varactor and to said variable reactance.

25. In a system for measuring the difference in frequency between a standard frequency and a further frequency, an oscillator, a first tuner for said oscillator, a second control signal-controlled tuner for said oscillator, means for achieving and maintaining a setting of said first tuner which tunes said oscillator to said standard frequency, and means operative while said first tuner maintains said setting for applying a control signal to said control signal-controlled tuner of such value that the frequency of said oscillator varies into equality with said further frequency, and means for measuring the variation of said value of said control signal required to achieve said equality, 26. The combination according to claim 25, wherein is provided a phase-locked loop phase detector, each of said first tuner and said second tuner being separately responsive to said phase detector at discrete times in alternation.

* * * * *